US012807173B2

(12) United States Patent
Tambo et al.

(10) Patent No.: US 12,807,173 B2
(45) Date of Patent: Nov. 24, 2026

(54) NOTIFICATION DEVICE AND AGRICULTURAL FIELD WORK VEHICLE

(71) Applicant: Kubota Corporation, Osaka (JP)

(72) Inventors: Toru Tambo, Sakai (JP); Yuki Kubota, Sakai (JP)

(73) Assignee: Kubota Corporation, Osaka (JP)

( * ) Notice: Subject to any disclaimer, the term of this patent is extended or adjusted under 35 U.S.C. 154(b) by 66 days.

(21) Appl. No.: 18/910,234

(22) Filed: Oct. 9, 2024

(65) Prior Publication Data

US 2025/0026364 A1 Jan. 23, 2025

Related U.S. Application Data

(63) Continuation of application No. PCT/JP2023/014160, filed on Apr. 6, 2023.

(30) Foreign Application Priority Data

Apr. 13, 2022 (JP) ................................ 2022-066506

(51) Int. Cl.
*B60W 50/14* (2020.01)
*B60W 10/20* (2006.01)

(52) U.S. Cl.
CPC ........... *B60W 50/14* (2013.01); *B60W 10/20* (2013.01); *B60W 2050/143* (2013.01); *B60W 2050/146* (2013.01); *B60W 2300/15* (2013.01)

(58) Field of Classification Search
CPC ................ B60W 50/14; B60W 10/20; B60W 2050/143; B60W 2050/146; B60W 2300/15; A01B 69/00; B62D 6/00
See application file for complete search history.

(56) References Cited

U.S. PATENT DOCUMENTS

2015/0097707 A1* 4/2015 Nelson, Jr. ............. B60K 35/25
340/984
2016/0119897 A1* 4/2016 Kim .................. H04M 1/72454
455/569.2
2018/0338408 A1 11/2018 Shinkai et al.
2019/0329764 A1 10/2019 Matsuzaki
(Continued)

FOREIGN PATENT DOCUMENTS

JP 2001343988 A 12/2001
JP 2013199147 A * 10/2013
(Continued)

OTHER PUBLICATIONS

International Search Report in PCT/JP2023/014160, mailed May 30, 2023, 2 pages.

(Continued)

*Primary Examiner* — Toya Pettiegrew
(74) *Attorney, Agent, or Firm* — Keating & Bennett, LLP

(57) ABSTRACT

A notification device installed in a work vehicle includes a buzzer to output a sound, a first speaker to output voice guidance, and a notification controller configured or programmed to control the buzzer and the first speaker. The notification controller is configured or programmed to, when executing control over the buzzer and the first speaker, first execute a first control to cause the buzzer to output the sound, and execute a second control to cause the first speaker to output the voice guidance after the buzzer completes outputting the sound.

13 Claims, 9 Drawing Sheets

(56) References Cited

U.S. PATENT DOCUMENTS

| | | | | |
|---|---|---|---|---|
| 2019/0360178 | A1* | 11/2019 | Morimoto ................ | G05G 1/01 |
| 2021/0397190 | A1 | 12/2021 | Takase et al. | |
| 2022/0107649 | A1 | 4/2022 | Kikumoto et al. | |
| 2023/0279638 | A1* | 9/2023 | Danguchi ............. | E02F 9/2004 |

FOREIGN PATENT DOCUMENTS

| | | | |
|---|---|---|---|
| JP | 2017081561 | A | 5/2017 |
| JP | 2018198583 | A | 12/2018 |
| JP | 2019103467 | A | 6/2019 |
| JP | 2020099225 | A | 7/2020 |
| JP | 2021049951 | A | 4/2021 |
| JP | 2022003578 | A | 1/2022 |

OTHER PUBLICATIONS

Written Opinion in PCT/JP2023/014160, mailed May 30, 2023, 4 pages.

Official Communication issued in corresponding European Patent Application No. 23788250.1, mailed on Mar. 23, 2026, 8 pages.

* cited by examiner

NOTIFICATION DEVICE AND AGRICULTURAL FIELD WORK VEHICLE

CROSS REFERENCE TO RELATED APPLICATIONS

This application claims the benefit of priority to Japanese Patent Application No. 2022-066506 filed on Apr. 13, 2022 and is a Continuation application of PCT Application No. PCT/JP2023/014160 filed on Apr. 6, 2023. The entire contents of each application are hereby incorporated herein by reference.

BACKGROUND OF THE INVENTION

1. Field of the Invention

The present invention relates to notification devices and agricultural field work vehicles including notification devices.

2. Description of the Related Art

For example, a work vehicle disclosed in JP 2020-099225A (referred to as a "travelling working machine" in JP 2020-099225A) is equipped with a notification device (referred to as a "notification unit" in JP 2020-099225A). The notification device is configured to display the condition of the work vehicle, guidance, etc., mainly with use of a screen.

SUMMARY OF THE INVENTION

The operator often operates a work vehicle while checking the surrounding conditions and may not have time to visually check the display installed in the work vehicle. There is a problem in how to reliably inform the operator of the condition of the work vehicle, guidance, etc.

Example embodiments of the present invention provide notification devices each capable of reliably notifying an operator of the condition of a work vehicle, guidance, etc.

According to an example embodiment of the present invention, a notification device in a work vehicle includes a buzzer to output a sound, a first speaker to output voice guidance, and a notification controller configured or programmed to control the buzzer and the first speaker, the notification controller being configured or programmed to, when executing control over the buzzer and the first speaker, execute a first control to cause the buzzer to output the sound, and execute a second control to cause the first speaker to output the voice guidance after the buzzer completes outputting the sound.

According to an example embodiment of the present invention, a notification device includes a buzzer and a speaker to provide an audio notification to the operator. Therefore, even if the operator does not have time to visually check the condition of the work vehicle, guidance, etc., due to operating the work vehicle while checking the surroundings, the operator can reliably check the condition of the work vehicle, guidance, etc. by listening to the audio. In addition, according to an example embodiment of the present invention, first the buzzer outputs a sound, and after the buzzer completes outputting the sound, the first speaker outputs voice guidance. Therefore, the sound of the buzzer and the sound of the first speaker do not mix with each other. This allows the operator to know from the sound of the buzzer that voice guidance is about to be provided and allows the operator to reliably hear the voice guidance that follows. In this way, an example embodiment of the present invention provides a notification device that can reliably inform the operator of the condition of the work vehicle, guidance, etc.

It is preferable that a notification device according to an example embodiment of the present invention includes a display capable of displaying notification information, and the notification controller is configured or programmed to, when executing the first control, cause the buzzer to output the sound and, at the same time, cause the display to display the notification information.

With this configuration, the display displays notification information. Therefore, for example, if the operator wants to know the details of the notification that is based on voice guidance, the operator can know the details of the notification based on voice guidance by checking the notification information displayed on the display. Therefore, for example, even if the operator is unfamiliar with the operation of the work vehicle, the operator can easily become familiar with the operation of the work vehicle as quickly as possible by checking the notification by voice guidance and the notification information displayed on the display.

In a notification device according to an example embodiment of the present invention, it is preferable that the display is configured to, upon displaying the notification information, continue displaying the notification information until the first speaker completes outputting the voice guidance.

With this configuration, the notification information continues to be displayed until the first speaker completes outputting the voice guidance, and therefore, the operator can more reliably check the notification information displayed on the display, compared to a configuration in which the display of the notification information ends before the first speaker completes outputting the voice guidance.

In a notification device according to an example embodiment of the present invention, it is preferable that the notification controller is configured or programmed to execute the first control and the second control based on a plurality of notification signals each corresponding to a priority, the plurality of notification signals include a first notification signal and a second notification signal having a higher priority than the first notification signal, and the notification controller is configured or programmed to, when the second notification signal is output after the first notification signal is output and before the execution based on the first notification signal of the second control completed, stop the execution based on the first notification signal of the first control and the second control and execute the first control and the second control based on the second notification signal.

A notification signal having a high priority includes more important notification information than a notification signal having a low priority, and thus has a greater need to be quickly communicated to the operator. With this configuration, when a second notification signal having a higher priority than the first notification signal is output, the execution based on the first notification signal of the first control and the second control is stopped and the first control and the second control based on the second notification signal are executed. Therefore, with this configuration, it is possible to quickly notify the operator of important notification information compared to a configuration with which the first control and the second control based on the second notification signal are executed after the execution based on the first notification signal of the first control and the second control is completed.

In a notification device according to an example embodiment of the present invention, it is preferable that the buzzer is configured to, when the second notification signal is output, output the sound based on the second notification without completing the output based on the first notification signal of the sound.

With this configuration, it is possible to quickly notify the operator of important notification information compared to a configuration with which the buzzer outputs the sound based on the second notification signal after the output based on the first notification signal of the sound is completed.

In a notification device according to an example embodiment of the present invention, it is preferable that the first speaker is configured to, when the second notification signal is output, immediately stop the output based on the first notification signal of the voice guidance, and output the voice guidance based on the second notification signal after the buzzer completes the output based on the second notification signal of the sound.

With this configuration, it is possible to quickly notify the operator of important notification information compared to a configuration with which the first speaker outputs voice guidance based on the second notification signal after the output of voice guidance based on the first notification signal is completed. In addition, since the output of voice guidance based on the first notification signal is immediately stopped, the operator can quickly become aware of the notification information with higher priority.

In a notification device according to an example embodiment of the present invention, it is preferable that the notification controller is configured or programmed to execute the first control and the second control based on a plurality of notification signals each corresponding to a priority, the plurality of notification signals include a first notification signal and a third notification signal having the same priority as the first notification signal or a lower priority than the first notification signal, and the notification controller is configured or programmed to, when the third notification signal is output after the first notification signal is output and before the execution based on the first notification signal of the second control is completed, execute the first control and the second control based on the third notification signal after completing the execution based on the first notification signal of the first control and the second control, the buzzer is configured to, when the third notification signal is output, output the sound based on the third notification signal after the first speaker completes the output based on the first notification signal of the voice guidance, and the first speaker is configured to, when the third notification signal is output, output the voice guidance based on the third notification signal after the buzzer completes the output based on the third notification signal of the sound.

When the third notification signal has the same priority as the first notification signal or a lower priority than the first notification signal, there is often no need to rush the notification based on the third notification signal. With this configuration, the notification controller is configured or programmed to execute the first control and the second control based on the third notification signal after the execution based on the first notification of the first control and the second control is completed. This allows the notification controller to provide notifications to the operator in order.

In a notification device according to an example embodiment of the present invention, it is preferable that the notification controller is configured or programmed to execute the first control and the second control based on a plurality of notification signals each corresponding to a priority, the plurality of notification signals include a first notification signal and a third notification signal having the same priority as the first notification signal or a lower priority than the first notification signal, and the notification controller is configured or programmed to be unable to execute the first control or the second control based on the third notification signal when the third notification signal is output after the first notification signal is output and before the execution based on the first notification signal of the second control is completed.

When the third notification signal has the same priority as the first notification signal or a lower priority than the first notification signal, there is often no need to rush the notification based on the third notification signal. In addition, it may be possible that the notification based on the third notification signal is not necessarily required, and it may not be necessarily desirable for the operator that the notification controller successively performs notification processing based on the first notification signal and the third notification signal. With this configuration, when the third notification signal is output before the execution of the second control based on the first notification signal is completed, the first control and the second control based on the third notification signal cannot be executed. Therefore, a suitable notification is provided to the operator at the appropriate time.

Another example embodiment of the present invention provides an agricultural field work vehicle including a notification device according to an example embodiment of the present invention, such that the agricultural field work vehicle is capable of performing automatic steering to travel along a target route, and the notification device is configured to provide a notification of information regarding the automatic steering.

With this configuration, even if the operator is unfamiliar with the automatic steering, the operator can be provided with appropriate voice guidance related to the automatic steering.

It is preferable that an agricultural field work vehicle according to an example embodiment of the present invention further includes a second speaker to output second voice guidance related to information other than information related to the automatic steering, and the notification controller is configured or programmed to cause the second speaker to immediately stop outputting the second voice guidance when at least one of the first and second controls is to be executed.

With this configuration, the notification controller is configured or programmed to control the second speaker, and is configured or programmed to stop the output from the second speaker and provide a notification related to the automatic steering. Therefore, it is possible to realize a configuration with which the sound of the buzzer and the sound of the second speaker do not mix with each other, and it is possible to realize a configuration with which the sound of the first speaker and the sound of the second speaker do not mix with each other. This allows the operator to reliably hear the audio information related to the automatic steering without being disturbed by the sound of the second speaker.

A notification device according to an example embodiment of the present invention may be configured without the first speaker. In such an example embodiment, a notification device in a work vehicle includes a buzzer to output a sound, a display to display notification information, and a notification controller configured or programmed to execute control over the buzzer and the display, and to, when executing control over the buzzer and the display, cause the buzzer to output the sound and, at the same time, cause the display to display the notification information. Even in this case, it is possible to realize a notification device that can reliably inform the operator of the condition of the work vehicle, guidance, etc.

A notification device according to an example embodiment of the present invention may be configured without the buzzer. In such an example embodiment, a notification device in a work vehicle includes a first speaker to output voice guidance, a display to display notification information, and a notification controller configured or programmed to control the first speaker and the display, and to, when executing control over the first speaker and the display, cause the first speaker to output the voice guidance and, at the same time, cause the display to display the notification information. Even in this case, it is possible to realize a notification device that can reliably inform the operator of the condition of the work vehicle, guidance, etc.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
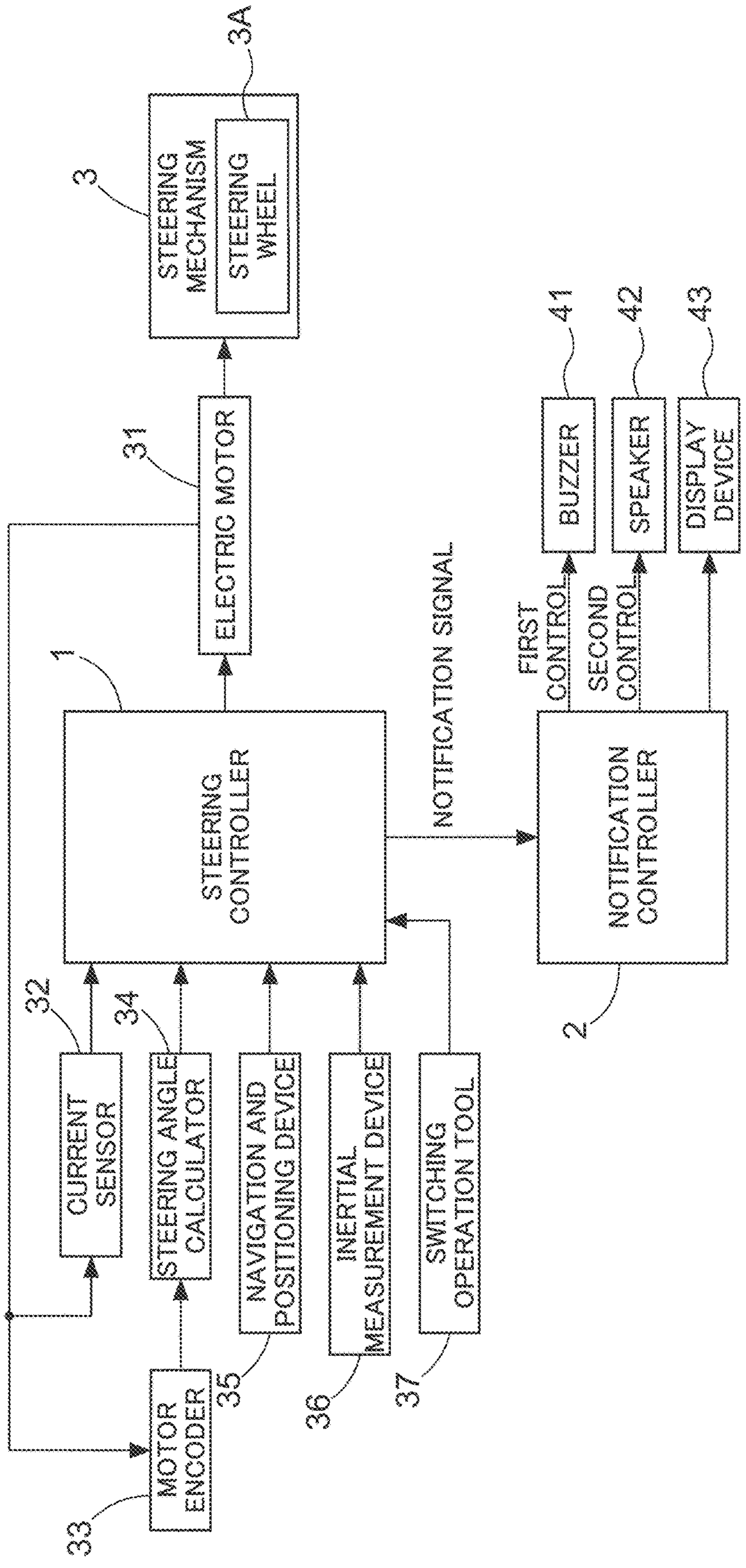
FIG. 1 is a block a diagram showing a steering controller and a notification controller.

Based on FIG. 1, a steering controller 1 and a notification controller 2 installed in an agricultural field work vehicle will be described. The steering controller 1 and the notification controller 2 may each be a physical device such as a microcomputer, or a combination of a device and software. Although not shown, the steering controller 1 and the notification controller 2 each include a storage device. These storage devices are, for example, non-volatile memories (e.g., flash memories) or ROMs such as EEPROMs. The storage devices temporarily or permanently store data generated by each of the functional units included in the steering controller 1 and the notification controller 2.

The steering controller 1 receives as input a detection value from a current sensor 32, a calculation value from a steering angle calculator 34, a positioning signal from a navigation and positioning device 35, and detection values from an inertial measurement device 36. The steering controller 1 outputs a current command value to an electric motor 31. In addition, the steering controller 1 outputs a notification signal to the notification controller 2. The notification signal from the steering controller 1 to the notification controller 2 may be, for example, an interruption control signal or a status signal informing of the control mode of the steering controller 1.

The notification controller 2 is configured or programmed to control a buzzer 41, a speaker 42, and a display device 43 based on a notification signal from the steering controller 1, thus notifying the operator or the like of information relating to automatic steering. The buzzer 41 outputs a sound. The speaker 42 outputs voice guidance. The voice guidance is natural language speech. The display device 43 is, for example, a mobile information terminal, or a touch panel display (a liquid crystal display device or an OLED display device) provided in an on-board device and is configured to display notification information. The mobile information terminal or the on-board device may be configured to also serve as the buzzer 41, the speaker 42, and the display device 43. In addition, the buzzer 41, the speaker 42, and the display device 43 may be integrated into a single unit (e.g., a display panel having the function of emitting a sound).

The electric motor 31 is interlocked with a steering mechanism 3, and when the electric motor 31 is driven, the steering mechanism 3 is driven. The steering mechanism 3 includes a steering wheel 3A, which accepts steering operations from the operator.

The current sensor 32 detects an actual current value in the electric motor 31. A motor encoder 33 detects the rotation angle of the electric motor 31. The motor encoder 33 is configured to detect the rotation angle of the electric motor 31 in the range of, for example, −10800 degrees to +10800 degrees. The motor encoder 33 may be, for example, a resolver encoder or an optical encoder.

The steering angle calculator 34 is configured or programmed to calculate the steering angular velocity of the steered wheels (wheels, crawlers, etc.) of the agricultural field work vehicle based on the detection value detected by the motor encoder 33. In addition, the steering angle calculator 34 is configured or programmed to calculate the steering angular velocity of the steered wheels of the agricultural field work vehicle based on the amount of change per unit time in the detection value detected by the motor encoder 33. The steering angular velocity of the steered wheels is the speed at which the orientation of the steered wheels (the steering angle of the steered wheels) changes. The greater the steering angular velocity, the more abruptly the steering angle of the steered wheels changes.

The navigation and positioning device 35 receives positioning signals from artificial satellites (not shown) used in GNSS (Global Navigation Satellite System, such as GPS, GLONASS, Galileo, QZSS, BeiDou, etc.).

The inertial measurement device 36 is, for example, a gyro acceleration sensor or a magnetic direction sensor and detects the angular velocity of the yaw angle of the agricultural field work vehicle and the acceleration in three mutually orthogonal axial directions over time. The inertial measurement device 36 can calculate the change in the heading angle of the agricultural field work vehicle by integrating the angular velocity. For this reason, the measurement data measured by the inertial measurement device 36 includes data indicating the heading (orientation) of the agricultural field work vehicle. Although not described in detail, the inertial measurement device 36 can measure the angular velocity of the turning angle of the agricultural field work vehicle, as well as the left-right tilt angle and the front-rear tilt angle of the agricultural field work vehicle. In this way, inertial measurement device 36 detects the orientation of the body of the agricultural field work vehicle.

The steering controller 1 calculates the position coordinates of the agricultural field work vehicle over time based on the positioning data output by the navigation and positioning device 35. This allows the steering controller 1 to acquire the position coordinates of the agricultural field work vehicle. Furthermore, the steering controller 1 calculates the attitude and heading of the agricultural field work vehicle based on the position coordinates of the agricultural field work vehicle and the detection values detected by the inertial measurement device 36. The attitude and heading of the agricultural field work vehicle is the direction in which the agricultural field work vehicle travels straight and forward or backward.

The following description will be given with reference to FIG. 3. First, while a tractor 5, which is an example of the work vehicle (the agricultural field work vehicle), is travelling, the steering controller 1 calculates initial attitude and heading based on the current position coordinates of the tractor 5 and the position coordinates of the tractor 5 at the point where it was travelling immediately before. Next, when the tractor 5 travels for a certain period of time after the initial attitude and heading has been calculated, the steering controller 1 calculates the amount of change in the heading by integrating the angular velocity detected by the inertial measurement device 36 during that certain period of travel.

Thereafter, the steering controller 1 updates the calculation result of the heading by adding the amount of change in the heading calculated in this manner to the initial attitude and heading. Thereafter, the amount of change in the attitude and heading is calculated in the same manner at regular time intervals, and the calculation results of the attitude and heading are successively updated. With the above configuration, the steering controller 1 calculates the heading of the tractor 5.

Figure 3:
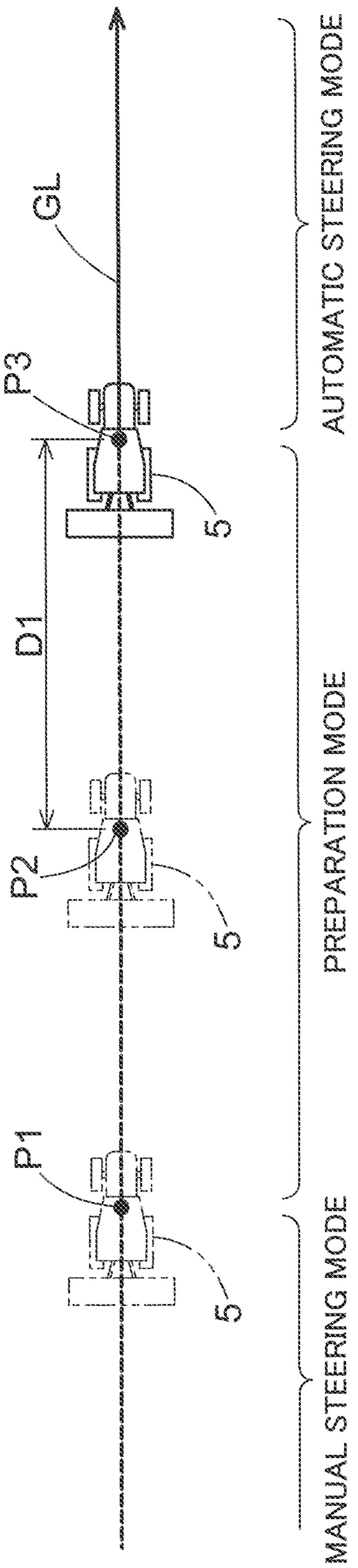
FIG. 3 is a diagram showing a transition from a manual steering mode to an automatic steering mode.

The steering mechanism 3 shown in FIG. 1 is configured to steer the front wheels of the tractor 5 in the example embodiment shown in FIG. 3. The steering controller 1 is configured or programmed to be capable of controlling the steering mechanism 3 and to execute automatic steering to enable the tractor 5 to automatically travel along an automatic steering target line GL. The automatic steering target line GL is equivalent to the "target route".

Figure 2:
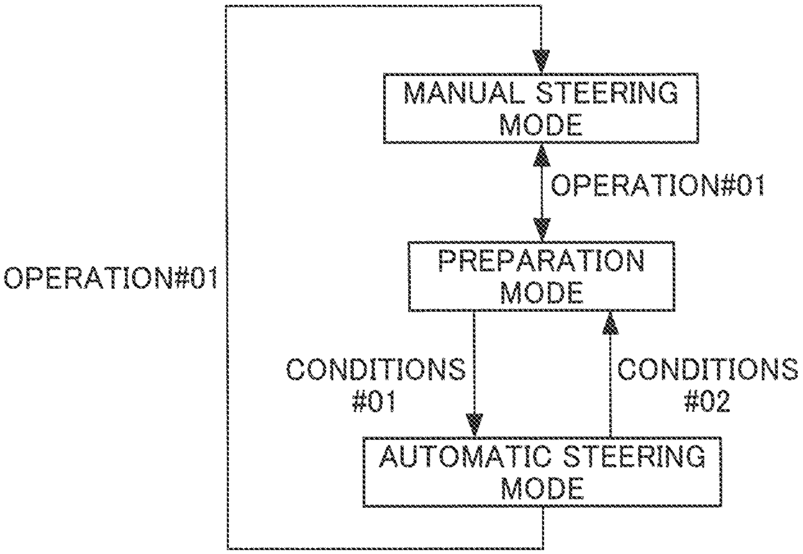
FIG. 2 is a diagram showing transitions between control modes of the steering controller.

As shown in FIG. 2, the steering controller 1 includes a plurality of control modes to control the steering mechanism 3. It is possible to switch between the plurality of control modes including a manual steering mode in which automatic steering is not executed and an automatic steering mode in which automatic steering can be executed. A switching operation tool 37 shown in FIG. 1 accepts a manual operation (human operation) to switch between the control modes of the steering controller 1.

When the control mode of the steering controller 1 is the manual steering mode, the steering controller 1 does not output a current command value to the electric motor 31. At this time, the wheels or crawlers of the agricultural field work vehicle are steered in response to a manual operation performed on a steering wheel 3A of the steering mechanism 3. Therefore, when the control mode of the steering controller 1 is the manual steering mode, the state of the steering controller 1 is a non-controlling state where the automatic steering is not performed. In this case, the steering controller 1 outputs various notification signals to the notification controller 2 based on a detection value from the current sensor 32, a calculation value from the steering angle calculator 34, a positioning signal from the navigation and positioning device 35, and a detection value from the inertial measurement device 36.

The steering controller 1 is configured or programmed to control the steering of the agricultural field work vehicle when the control mode of the steering controller 1 is the automatic steering mode so that the agricultural field work vehicle can perform automatic steering travel along the automatic steering target line GL (see FIG. 3) based on the positioning data output by the navigation positioning device 35 and the detection values detected by the inertial measurement device 36.

The steering controller 1 is configured or programmed to be capable of switching between the control modes based on an operation signal from the switching operation tool 37 and the condition of the agricultural field work vehicle. As described above, the switching operation tool 37 accepts a manual operation to switch the control mode of the steering controller 1 to the automatic steering mode. The operation on the switching operation tool 37 is shown as "operation #01" in FIG. 2. When the operation #01 is performed, the steering controller 1 switches the control mode from the manual steering mode to a preparation mode.

The steering controller 1 outputs a notification signal to the notification controller 2 when switching the control mode from the manual steering mode to the preparation mode. Thereafter, based on the notification signal from the steering controller 1, the notification controller 2 notifies the operator that the preparation for the transition to the automatic steering mode has been started. That is to say, the notification controller 2 causes the buzzer 41 to output a sound, the speaker 42 to output voice guidance, and the display device 43 to display notification information based on the notification signal from the steering controller 1.

The preparation mode is a control mode in which the preparation for the start of the automatic steering is performed, and manual steering by the operator continues in this preparation mode. Therefore, when the control mode of the steering controller 1 is the preparation mode, the state of the steering controller 1 is a non-controlling state where the automatic steering is not performed. Note that when the operation #01 is performed when the control mode of the steering controller 1 is the preparation mode, the steering controller 1 switches the control mode of the steering controller 1 from the preparation mode to the manual steering mode.

In the preparation mode, the steering controller 1 determines whether or not conditions #01 for the transition to the automatic steering mode are met. At this time, the operator manually operates the agricultural field work vehicle to prepare the conditions for the transition to the automatic steering mode. That is to say, based on the preparation mode, the operator performs manual steering to align the attitude and heading of the agricultural field work vehicle with a preset reference heading. The preset reference heading is, for example, a heading that has been set based on two points, the start point and the end point, of a teaching travel.

FIG. 3 shows a state in which the operation #01 is performed at a point P1 so that the control mode of the steering controller 1 is switched from the manual s steering mode to the preparation mode, and the tractor 5 travels from the point P1 to a point P2 based on manual steering.

The conditions #01 for the transition from the preparation mode to the automatic steering mode are, for example, that the main shift lever (not shown) operated by the operator is set to the forward position, that a clutch (not shown, e.g., a PTO clutch) for transmitting power to a work implement (not shown) of the agricultural field work vehicle is in a power transmitting state, that the difference between the attitude and heading of the agricultural field work vehicle and a preset reference heading is within a preset angle (e.g., 3 degrees), and so on.

In the preparation mode, the steering controller 1 outputs a notification signal to the notification controller 2. Thereafter, based on the notification signal from the steering controller 1, the notification controller 2 notifies the operator of guidance information for satisfying the conditions #01. That is to say, based on the notification signal from the steering controller 1, the notification controller 2 causes the buzzer 41 to output a sound, causes the speaker 42 to output the content of the operation to be performed to satisfy the conditions #01, and causes the display device 43 to display the content of the operation to be performed to satisfy the conditions #01.

If the control mode is the preparation mode and the necessary items of the conditions #01 are met, it is possible to switch to the automatic steering mode. When the agricultural field work vehicle travels a predetermined distance D1 in this state as shown in FIG. 3, the steering controller 1 generates the automatic steering target line GL and the control mode transitions from the preparation mode to the automatic steering mode. The automatic steering target line GL extends along the preset reference heading.

FIG. 3 shows a state in which the conditions #01 are met at the point P2 and the tractor 5 travels the predetermined distance D1 from the point P2 to a point P3. The predetermined distance D1 is not particularly limited and may be, for example, 1 meter.

The steering controller 1 outputs a notification signal to the notification controller 2 while the agricultural field work vehicle travels the predetermined distance D1. The notification controller 2 notifies the operator of the start of the automatic steering. At this time, based on the notification signal from the steering controller 1, the notification controller 2 causes the buzzer 41 to output a sound, causes the speaker 42 to output voice guidance saying, “Automatic steering will start soon”, and causes the display device 43 to display notification information. This configuration allows the operator to know when to release his/her hands from the steering wheel 3A.

In this way, the steering controller 1 is configured to change its state to the automatic control state when the tractor 5 travels the predetermined distance D1 set in advance in the same direction based on a manual operation performed on the steering wheel 3A in the non-controlling state. Note that the steering controller 1 may be configured to change its state to the automatic control state when the tractor 5 has traveled for a preset time (e.g., three to five seconds) in the same direction based on a manual operation performed on the steering wheel 3A in the non-controlling state.

When the control mode of the steering controller 1 is the automatic steering mode, the state of the steering controller 1 is an automatic control state where automatic steering is performed. Therefore, in the automatic control state, the steering controller 1 outputs to the electric motor 31 a current command value for instructing the agricultural field work vehicle to travel along the automatic steering target line GL.

A method for canceling the automatic steering mode will now be described. When “conditions #02” shown in FIG. 2 are detected during the execution of the automatic steering, the steering controller 1 ends the automatic steering. The “conditions #02” are conditions for stopping work. The conditions #02 are, for example, that the main shift lever operated by the operator is moved to an operating position other than the forward position, that the clutch to transmit power to the work implement of the agricultural field work vehicle is put into a power non-transmitting state, that the steering wheel 3A is manually moved in the left-right direction by an amount larger than a preset operating amount, and so on.

If any one of the items listed as the conditions #02 is met, the automatic steering is cancelled and the control mode of the steering controller 1 transitions from the automatic steering mode to the preparation mode. At this time, the steering controller 1 outputs a notification signal to the notification controller 2. Thereafter, based on the notification signal from the steering controller 1, the notification controller 2 notifies the operator of the end of the automatic steering by causing the buzzer 41 to output a sound, causing the speaker 42 to output voice guidance, and causing the display device 43 to display notification information.

Even if one of the items listed as the conditions #02 is met and the automatic steering ends, the control mode of the steering controller 1 transitions to the preparation mode and does not return to the manual steering mode. Therefore, the automatic steering can be resumed when the above conditions #01 are met. For this reason, for example, if the operator performs an operation corresponding to the conditions #02 at the edge of an agricultural field, and then turns the agricultural field work vehicle by 90 degrees or 180 degrees and travels along the preset reference heading, the above conditions #01 can be met. This will resume the automatic steering directly.

In this way, the steering controller 1 is configured or programmed to be capable of changing its state between a non-controlling state in which the automatic steering is not executed and an automatic control state in which the automatic steering is executed.

Note that when the control mode of the steering controller 1 is the automatic steering mode and the operator presses the switching operation tool 37 (the operation #01) during the automatic steering, the steering controller 1 switches the control mode of the steering controller 1 from the automatic steering mode to the manual steering mode, and the automatic steering executed by the steering controller 1 ends. When the automatic steering is cancelled, the current command value output from the steering controller 1 to the electric motor 31 becomes zero.

Figure 4:
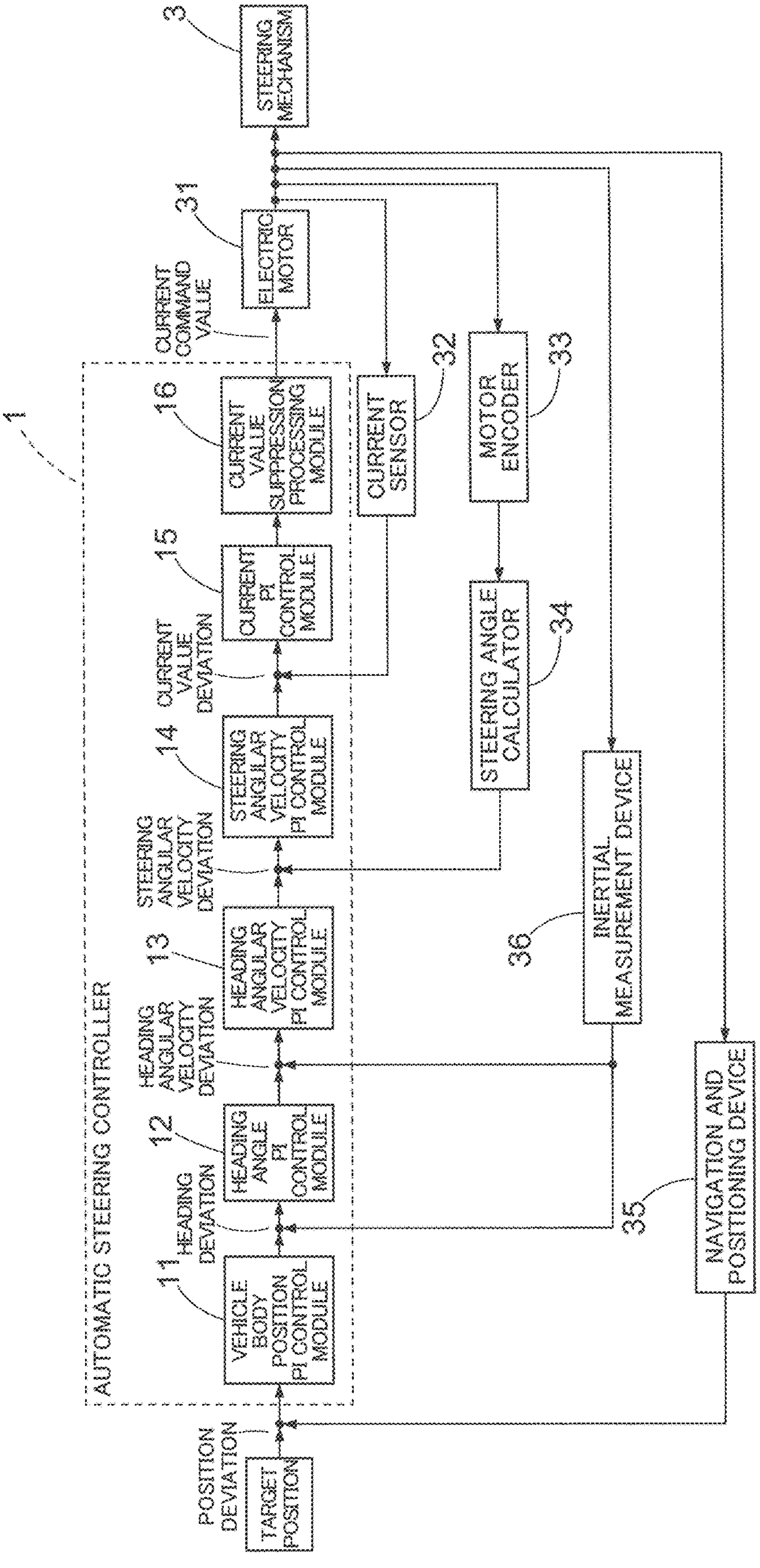
FIG. 4 is a block diagram showing automatic steering control in the steering controller.

The automatic steering control in the present example embodiment will be described with reference to FIG. 4. The steering controller 1 includes a plurality of modules. The steering controller 1 includes a vehicle body position PI control module 11, a heading angle PI control module 12, a heading angular velocity PI control module 13, a steering angular velocity PI control module 14, a current PI control module 15, and a current value suppression processing module 16.

The vehicle body position PI control module 11 calculates a position deviation amount, which is the difference between the target position to be reached by the agricultural field work vehicle travelling along the automatic steering target line GL and the actual position coordinates of the agricultural field work vehicle based on the positioning signal from the navigation positioning device 35. The position deviation amount is the amount of positional deviation to the right or left in the direction of travel with respect to the automatic steering target line GL. The vehicle body position PI control module 11 calculates the target heading for the agricultural field work vehicle to travel along the automatic steering target line GL based on the position deviation amount.

The heading angle PI control module 12 calculates a heading deviation amount, which is the difference between the target heading calculated by the vehicle body position PI control module 11 and the actual heading of the agricultural field work vehicle measured by the inertial measurement device 36. Thereafter, the heading angle PI control module 12 calculates a target heading angular velocity for aligning the heading of the agricultural field work vehicle with the target heading based on the heading deviation amount. The target heading angular velocity for aligning the heading of the agricultural field work vehicle to the target heading is the target amount of change per unit time in the orientation of the body of the agricultural field work vehicle.

The heading angular velocity PI control module 13 calculates a heading angular velocity deviation amount, which is the difference between the target heading angular velocity calculated by the heading angle PI control module 12 and the actual heading angular velocity measured by the inertial measurement device 36. The heading angular velocity PI control module 13 calculates a target steering angular velocity of the steered wheels to turn the agricultural field work vehicle in accordance with the target heading angular velocity, based on the heading angular velocity deviation amount. The target steering angular velocity of the steered wheels is a target amount of change per unit time in the steering angle of the steered wheels.

The steering angular velocity PI control module 14 calculates a steering angular velocity deviation amount, which is the difference between the target steering angular velocity calculated by the heading angular velocity PI control module 13 and the actual steering angular velocity of the steered wheels calculated by the steering angle calculator 34. The steering angular velocity PI control module 14 calculates a target current value for the electric motor 31 based on the steering angular velocity deviation amount.

The current PI control module 15 calculates a current value deviation amount, which is the difference between the target current value calculated by the steering angular velocity PI control module 14 and the actual current value of the electric motor 31 detected by the current sensor 32. The current PI control module 15 adjusts the above target current value based on the current value deviation amount, and outputs a more appropriate current command value to the electric motor 31. With this configuration, when the steering controller 1 is in the automatic control state, the electric motor 31 drives and controls the steering mechanism 3 based on the current command value. When the agricultural field work vehicle is the tractor 5 shown in FIG. 3, the front wheels of the tractor 5 are steered by driving the steering mechanism 3. Thereafter, the steering angle of the steered wheels is adjusted, and the agricultural field work vehicle travels along the automatic steering target line GL.

In the steering controller 1 according to the present example embodiment, at the start time of automatic steering control, the current command value calculated by the current PI control module 15 is not output as is, and the current value suppression processing module 16 sets the current command value to be smaller and outputs it to the electric motor 31. The following describes current command value suppression processing performed at the start of the automatic steering.

When the control mode of the steering controller 1 is switched from the manual steering mode to the automatic steering mode via the preparation mode, the steering controller 1 starts the automatic steering control of the agricultural field work vehicle. When the steering controller 1 starts the automatic steering control of the agricultural field work vehicle, a large current command value may be output from the steering controller 1 depending on the turning angle of the steered wheels and may cause the steering mechanism 3 to drive at high speed.

The steering wheel 3A turns in response to the driving of the steering mechanism 3. In other words, the steering wheel 3A is configured to change the steering amount in conjunction with the drive control of the steering mechanism 3 by the electric motor 31. Therefore, when the steering mechanism 3 drives at high speed, the steering wheel 3A turns at high speed. If this occurs, the steering wheel 3A may turn abruptly at the start of the automatic steering control, which may be surprising or uncomfortable for the operator.

To avoid such inconvenience, in the present example embodiment, the current value suppression processing module 16 performs processing to suppress abrupt movements of the steering wheel 3A at the start time of the automatic steering control. In other words, the steering controller 1 is configured to perform suppression processing to suppress the current command value for the electric motor 31 when its state is changed from the non-controlling state to the automatic controlled state. To rephrase, the steering controller 1 is configured to output a current command value to the electric motor 31 in response to a state change from the non-controlling state to the automatic control state so that the amount of change per unit time in the steering amount of the steering wheel 3A falls below a predetermined threshold value.

Figure 5:
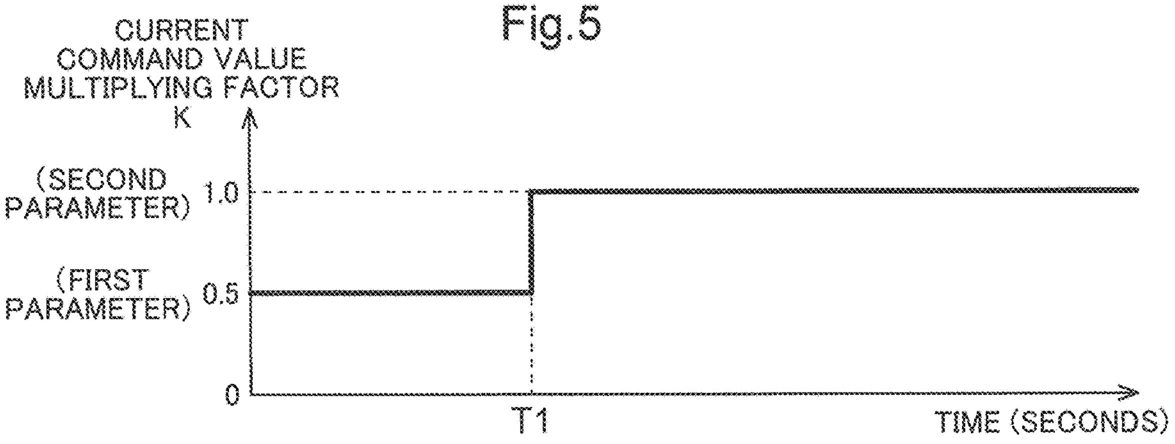
FIG. 5 is a graph showing suppression processing performed to suppress a current command value at the start of automatic steering.
Figure 6:
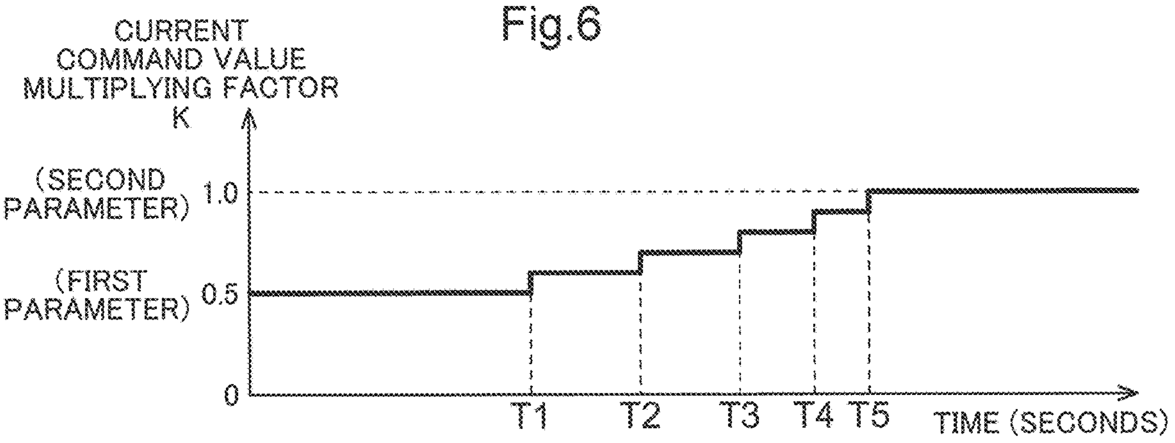
FIG. 6 is a graph showing the suppression processing performed to suppress a current command value at the start of automatic steering.
Figure 7:
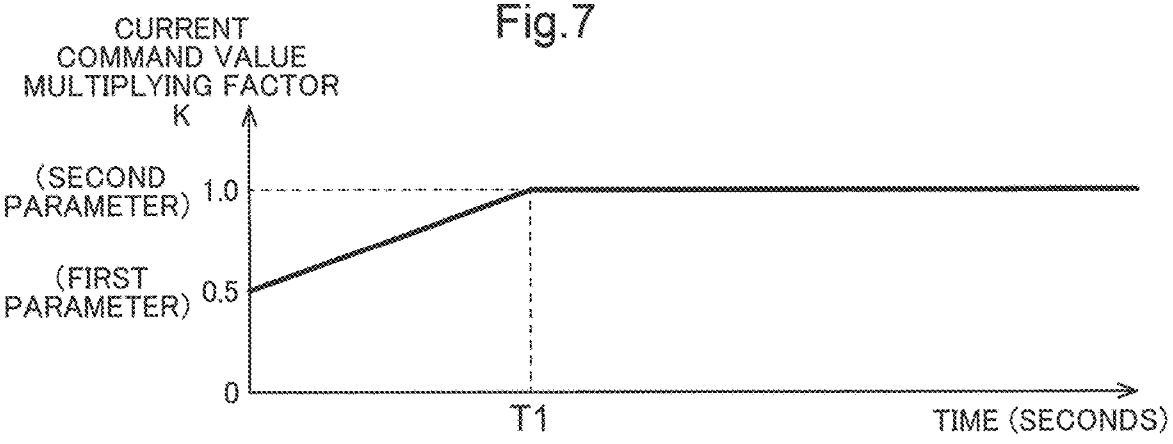
FIG. 7 is a graph showing the suppression processing performed to suppress a current command value at the start of automatic steering.

FIGS. 5 to 7 show examples of the suppression processing performed to suppress the current command value for the electric motor 31. In the present example embodiment, a multiplying factor K for the current command value is prepared. The current value suppression processing module 16 sets the multiplying factor K within the range from a first parameter to a second parameter, and multiplies the current command value calculated by the current PI control module 15 by the multiplying factor K. In the examples shown in FIGS. 5 to 7, 0.5 is shown as the first parameter of the multiplying factor K, and 1.0 is shown as the second parameter of the multiplying factor K, for example.

When the multiplying factor K is 1.0, the current value suppression processing module 16 outputs the current command value calculated by the current PI control module 15 to the electric motor 31 as is. When the multiplying factor K is 0.5, the current value suppression processing module 16 suppresses the current command value calculated by the current PI control module 15 to half the current value and outputs it to the electric motor 31.

In the example shown in FIG. 5, the current value suppression processing module 16 sets the multiplying factor K to 0.5 (the first parameter) until a preset time T1 has elapsed from the start of the automatic steering control, for example. The preset time T1 is set to, for example, 5 seconds. The preset time T1 shown in FIG. 5 is the end time at which the suppression processing ends, for example. That is to say, the steering controller 1 is configured or programmed to perform suppression processing from the start time at which the suppression processing is started to the end time at which the preset time T1 has elapsed from the start time.

During the period from the start time of the automatic steering control to the elapse of the preset set time T1, the current value suppression processing module 16 suppresses the current command value calculated by the current PI control module 15 to half the current value and outputs it to the electric motor 31. That is to say, the current value suppression processing module 16 of the steering controller 1 is configured to keep the multiplying factor K at 0.5 (the first parameter) during the period from the start time to the preset time T1, for example. Thereafter, the current value suppression processing module 16 changes the multiplying factor K stepwise from 0.5 (the first parameter) to 1.0 (the second parameter) when the preset time T1 has elapsed, for example. In addition, the current value suppression processing module 16 thereafter outputs the current command value calculated by the current PI control module 15 to the electric motor 31 as is.

In the example shown in FIG. 6, the current value suppression processing module 16 sets the multiplying factor K to 0.5 (the first parameter) at the start time of the automatic steering control, for example. A preset time T5 shown in FIG. 6 is the time at which the suppression processing ends, for example. The current value suppression processing module 16 changes the multiplying factor K in a plurality of steps within the range from 0.5 (the first parameter) to 1.0 (the second parameter) from the start of the automatic steering control until the preset time T5 has elapsed, for example. In the example shown in FIG. 6, the multiplying factor K is changed in five steps. Note that, in the example shown in FIG. 6, the multiplying factor K is not limited to being changed in five steps and may be changed appropriately in any number of steps equal to or greater than two.

In the example shown in FIG. 6, the current value suppression processing module 16 sets the multiplying factor K to 0.5 (the first parameter) until the preset time T1 has elapsed from the start of the automatic steering control, for example. This allows the current command value calculated by the current PI control module 15 to be suppressed to half the current value. The current value suppression processing module 16 increases the multiplying factor K by, for example, 0.1 at each of preset times T1, T2, T3, T4, and T5, for example. At the preset time T5, the multiplying factor K reaches 1.0 (the second parameter), for example. That is to say, the current value suppression processing module 16 of the steering controller 1 is configured to change the multiplying factor K stepwise so that the multiplying factor K approaches 1.0 (the second parameter) over the period from the start time of the automatic steering control to the preset time T5, for example. After the preset time T5 has elapsed, the current value suppression processing module 16 thereafter outputs the current command value calculated by the current PI control module 15 to the electric motor 31 as is.

In the example shown in FIG. 7, the current value suppression processing module 16 sets the multiplying factor K to 0.5 (the first parameter) at the start time of the automatic steering control, for example. The current value suppression processing module 16 proportionally changes the multiplying factor K within the range from 0.5 (the first parameter) to 1.0 (the second parameter) from the start of the automatic steering control until the preset time T1 has elapsed, for example. The preset time T1 is set to, for example, 5 seconds. The preset time T1 shown in FIG. 7 is the time at which the suppression processing ends, for example. That is to say, the current value suppression processing module 16 of the steering controller 1 is configured to change the multiplying factor K so that the multiplying factor K approaches 1.0 (the second parameter) as time elapses over the period from the start time of the automatic steering control to the preset time T1, for example. After the preset time T1 has elapsed, the current value suppression processing module 16 thereafter outputs the current command value calculated by the current PI control module 15 to the electric motor 31 as is.

In this way, the steering controller 1 is configured or programmed to set the multiplying factor K to the first parameter at the start time of the automatic steering control, and to set the multiplying factor K to the second parameter larger than the first parameter at the end time of the automatic steering control after the preset time T1 (the preset time T5 in FIG. 6) has elapsed. With this configuration, at the start time of the automatic steering control, the amount of change per unit time in the steering amount of the steering wheel 3A becomes smaller than in a configuration in which suppression processing is not performed, and the steering wheel 3A starts to rotate at a slower speed. As a result, the steering controller 1 is configured or programmed to output a current command value to the electric motor 31 in response to a state change from the non-controlling state to the automatic control state so that the amount of change per unit time in the steering amount of the steering wheel 3A falls below a predetermined threshold value.

The notification controller 2, the buzzer 41, the speaker 42, and the display device 43 shown in FIG. 1 are configured to be capable of notifying the operator of various types of information related to automatic steering according to the control mode of the steering controller 1. The various types of information related to the automatic steering include, for example, information to alert the operator, guidance information to inform the method of operator, and information to inform the operator of the states of the devices in the agricultural field work vehicle. The notification controller 2 is, for example, a voice synthesis LSI, and is separate from the buzzer 41, the speaker 42, and the display device 43. The buzzer 41, the speaker 42, and the display device 43 are located in appropriate positions in the cockpit of the agricultural field work vehicle and are connected to the notification controller 2 by wiring. The notification controller 2, the buzzer 41, the speaker 42, and the display device 43 are equivalent to the "notification device". The notification controller 2 is equivalent to the "notification controller". The speaker 42 is equivalent to the "first speaker". The display device 43 is equivalent to the "display".

The notification controller 2 is configured or programmed to be capable of controlling the buzzer 41, the speaker 42, and the display device 43. The operator can recognize various types of information related to the automatic steering based on the sounds and displays output from the buzzer 41, speaker 42, and the display device 43.

When manually operating the agricultural field work vehicle, the operator often makes fine adjustments to the position and speed of the agricultural field work vehicle while visually checking the surroundings in the agricultural field, crop positions, etc. Therefore, it is conceivable that when the operator tries to start the automatic steering of the agricultural field work vehicle, the operator may be unable to visually check the display device 43 while visually checking the surroundings in the agricultural field, crop positions, etc. In particular, if the operator is unfamiliar with switching the control mode of the steering controller 1 to the automatic steering mode, it may be difficult for the operator to understand what to do to cause the agricultural field work vehicle to start the automatic steering while visually checking the surroundings in the agricultural field, crop positions, etc. If this is the case, the automatic steering function of the agricultural field work vehicle will be difficult for the operator to use.

In the present example embodiment, various types of information related to the automatic steering are output from the speaker 42 as natural language speech. This allows the operator to know what to do to cause the agricultural field work vehicle to start automatic steering at the appropriate time, while visually checking the surroundings in the agricultural field, crop positions, etc. In other words, the operator can perform an operation to cause the agricultural field work vehicle to start the automatic steering by following the voice guidance output from the speaker 42 while visually checking the surroundings in the agricultural field, crop positions, etc. without looking at the display device 43. This allows the operator to concentrate on checking the surroundings in the agricultural field, crop positions, etc.

In addition, even if the operator is unfamiliar with switching the control mode of the steering controller 1 to the automatic steering mode, it is easy for the operator to cause the agricultural field work vehicle to start the automatic steering by following the voice guidance output from the speaker 42. This makes the automatic steering function of the agricultural field work vehicle easy for the operator to use.

Examples of voice guidance output from the speaker 42 include messages such as "Please switch to the automatic steering mode", "Warming up", "Please register start (or end) point", "Please take your seat", "Please turn the body left (or right)", "A malfunction has been detected", "Positioning level has decreased", "Automatic steering will start soon", and "Good work".

As described above, the notification controller 2 is configured or programmed to be capable of controlling the buzzer 41, the speaker 42, and the display device 43 based on a notification signal from the steering controller 1, thus notifying the operator or the like of information relating to automatic steering.

Figure 8:
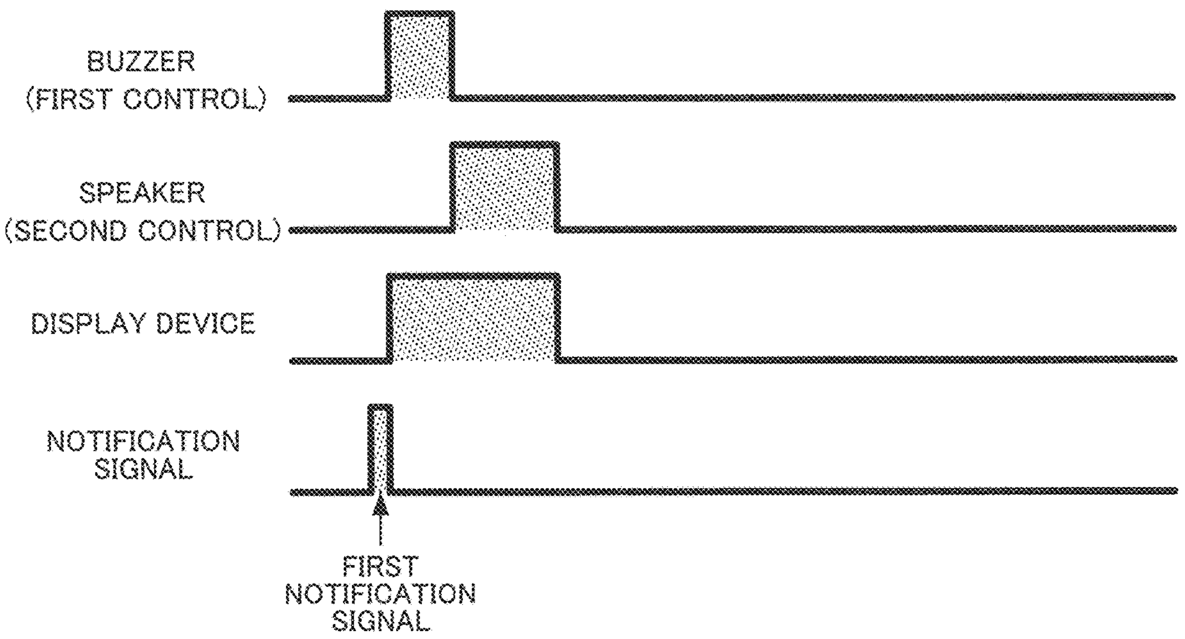
FIG. 8 is a logic graph showing output processing performed by the notification controller.

FIG. 8 shows a first notification signal as an example of the notification signal. As shown in FIG. 8, upon receiving a notification signal from the steering controller 1, the notification controller 2 executes control over the buzzer 41 and the speaker 42. The notification controller 2 is configured or programmed to, at this time, first execute a first control to cause the buzzer 41 to output a sound and execute a second control to cause the speaker 42 to output voice guidance after the buzzer 41 completes outputting the sound.

That is to say, the sound from the buzzer 41 and the voice guidance from the speaker 42 do not overlap, and the voice guidance is output from the speaker 42 after the sound from the buzzer 41 stops. This makes it easier for the operator to hear the voice guidance from the speaker 42.

Notification information is displayed by the display device 43 in conjunction with each of the outputs of a sound from the buzzer 41 and voice guidance from the speaker 42. The notification controller 2 is configured or programmed to, when first executing the first control to cause the buzzer 41 to output a sound, cause the buzzer 41 to output the sound and, at the same time, cause the display device 43 to display notification information. That is to say, the display device 43 starts displaying the notification information at the same time that the buzzer 41 starts outputting the sound.

The display device 43 is configured to, once the display device 43 starts displaying notification information, continue displaying the notification information until the speaker 42 completes outputting the voice guidance. The notification controller 2 causes the display device 43 to display content similar to the content of the voice guidance from the speaker 42. That is to say, the content of the notification information displayed on the display device 43 is linked to the content of the voice guidance from the speaker 42. When the voice guidance from the speaker 42 ends, the display device 43 stops displaying the notification information related to the automatic steering and switches to another screen. That is to say, the display device 43 stops displaying the notification information at the same time that the speaker 42 stops outputting the voice guidance.

There are a plurality of types of notification signals output from the steering controller 1. Notification signals are classified into types according to priority. That is to say, the notification signals that the steering controller 1 can output include a plurality of notification signals each corresponding to a priority.

Figure 9:
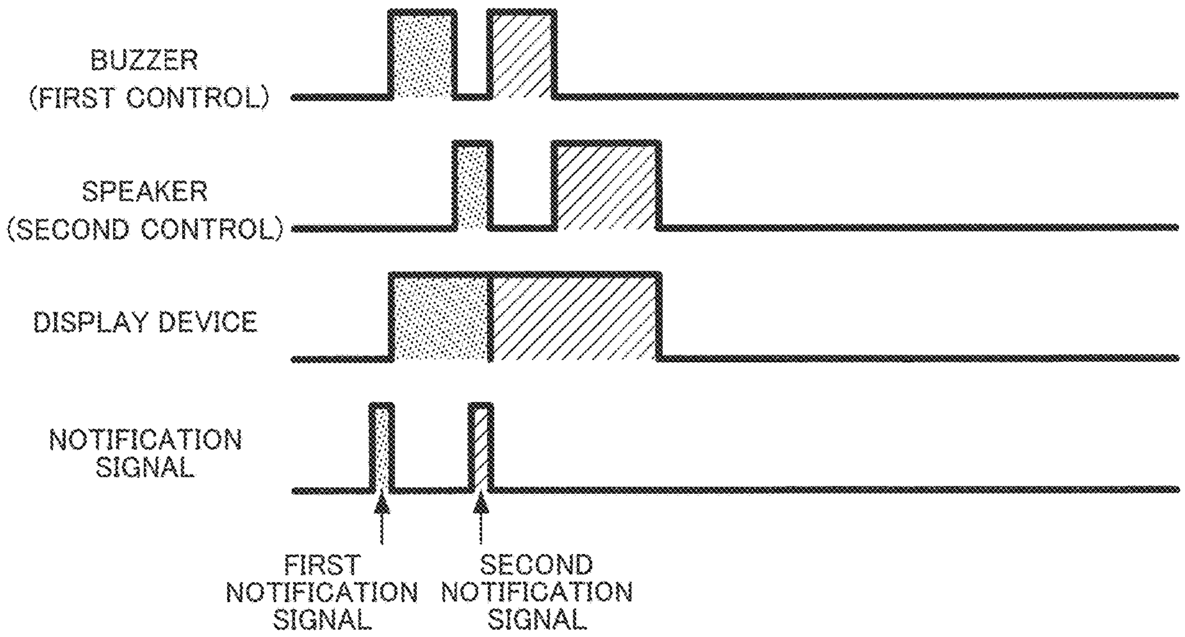
FIG. 9 is a logic diagram showing the output processing performed by the notification controller.

In the example shown in FIG. 9, a first notification signal and a second notification signal are shown as the plurality of notification signals. The second notification signal has a higher priority than the first notification signal. That is to say, in the present example embodiment, the plurality of notification signals include a first notification signal and a second notification signal that has a higher priority than the first notification signal.

In the example shown in FIG. 9, after the first notification signal is output, the notification controller 2 first executes the first control to cause the buzzer 41 to output a sound based on the first notification signal. Then, after the buzzer 41 completes outputting the sound, the notification controller 2 executes the second control to cause the speaker 42 to output voice guidance based on the first notification signal. However, in the example shown in FIG. 9, before the notification controller 2 completes the execution based on the first notification signal of the second control, the second notification signal, which has a higher priority than the first notification signal, is output. The notification controller 2 is configured or programmed to, in this case, stop the execution based on the first notification signal of the first control and the second control. The notification controller 2 is configured or programmed to then execute the first control and the second control based on the second notification signal.

In the example shown in FIG. 9, when the second notification signal is output, the notification controller 2 has completed the first control based on the first notification signal, and the buzzer 41 has completed outputting the sound. However, for example, if the second notification signal is output before the notification controller 2 completes the execution based on the first notification signal of the first control, the notification controller 2 immediately stops the execution based on the first notification signal of the first control. The buzzer sound based on the first notification signal of the buzzer 41 stops before output is completed. That is to say, the buzzer 41 is configured to, when the second notification signal is output, output a sound based on the second notification signal without completing the output based on the first notification signal of the sound.

In the example shown in FIG. 9, at the time immediately before the second notification signal is output, the notification controller 2 is in the middle of executing the second control based on the first notification signal, and the speaker 42 is in the middle of outputting voice guidance. When the second notification signal is output, the notification controller 2 immediately stops the execution based on the first notification signal of the second control. The voice guidance from the speaker 42 based on the second notification signal stops before output is completed. That is to say, the speaker 42 is configured to, when the second notification signal is output, immediately stop the output based on the first notification signal of the voice guidance, and output voice guidance based on the second notification signal after the buzzer 41 completes outputting the sound based on the second notification signal.

In the example shown in FIG. 9, at the time immediately before the second notification signal is output, the notification controller 2 is executing control to cause the display device 43 to display notification information based on the first notification information, and the display device 43 is displaying the notification information based on the first notification information. When the second notification signal is output, the notification controller 2 immediately stops the control based on the first notification signal of the display device 43 and executes the control based on the second notification signal of the display device 43. Thereafter, the display on the display device 43 is switched from the display based on the first notification signal to the display based on the second notification signal. In addition, the display device 43 ends the display based on the second notification signal of the notification information at the same time as the speaker 42 ends the output based on the second notification signal of the voice guidance.

Figure 10:
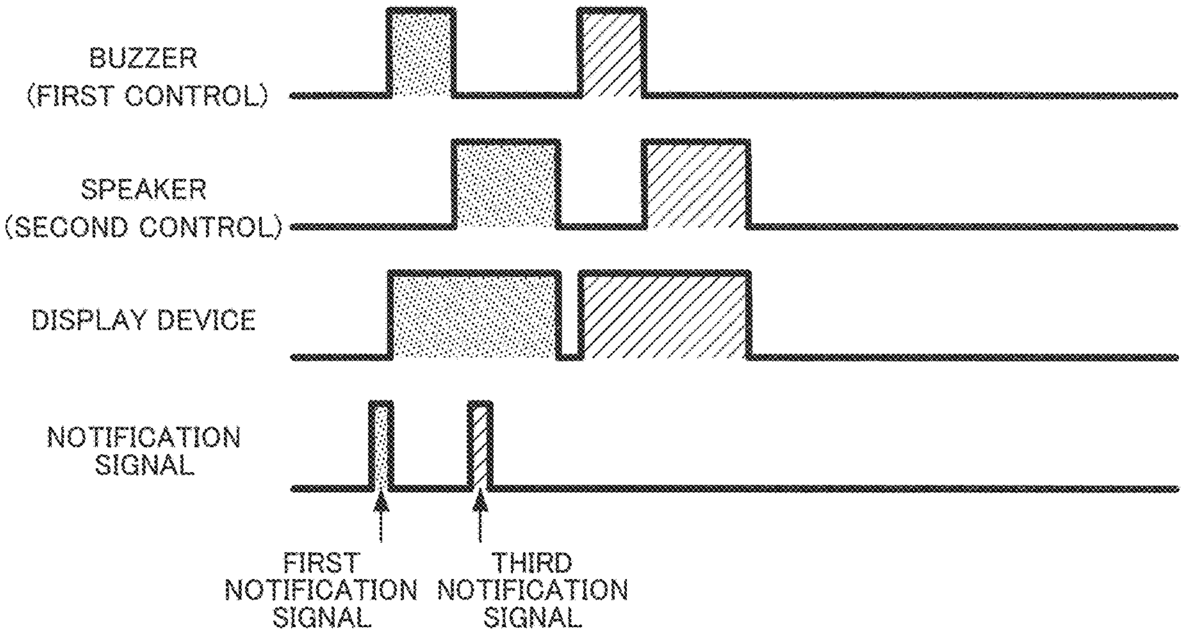
FIG. 10 is a logic graph showing the output processing performed by the notification controller.

In the example shown in FIG. 10, a first notification signal and a third notification signal are shown as the plurality of notification signals. The third notification signal has the same priority as the first notification signal or a lower priority than the first notification signal. That is to say, in the present example embodiment, the plurality of notification signals include a first notification signal and a third notification signal that has the same priority as the first notification signal or a lower priority than the first notification signal.

In the example shown in FIG. 10, after the first notification signal is output, the notification controller 2 first executes the first control to cause the buzzer 41 to output a sound based on the first notification signal. Then, after the buzzer 41 completes outputting the sound, the notification controller 2 executes the second control to cause the speaker 42 to output voice guidance based on the first notification signal. In the example shown in FIG. 10, the third notification signal is output before the notification controller 2 completes the execution of the second control based on the first notification signal. The notification controller 2 is configured or programmed to, in this case, continue the execution based on the first notification signal of the first control and the second control. The notification controller 2 is configured or programmed to, after completing the execution of the first control and the second control based on the first notification signal, execute the first control and the second control based on the third notification signal.

In the example shown in FIG. 10, when the third notification signal is output, the notification controller 2 has completed the first control based on the first notification signal, and the buzzer 41 has completed outputting the sound. For example, even if the third notification signal is output before the notification controller 2 completes the execution based on the first notification signal of the first control, the notification controller 2 continues the execution based on the first notification signal of the first control. That is to say, the buzzer 41 is configured to, when the third notification signal is output, output the sound based on the third notification signal after the buzzer 41 completes the output based on the first notification signal of the sound and the speaker 42 completes the output based on the first notification signal of the voice guidance.

In the example shown in FIG. 10, at the time immediately before the third notification signal is output, the notification controller 2 is in the middle of executing the second control based on the first notification signal, and the speaker 42 is in the middle of outputting voice guidance. When the third notification signal is output, the notification controller 2 continues the execution of the second control based on the first notification signal. That is to say, the speaker 42 is configured to, when the third notification signal is output, complete the output of the voice guidance based on the first notification signal and then, after the buzzer 41 completes outputting the sound based on the third notification signal, output voice guidance based on the third notification signal.

In the example shown in FIG. 10, at the time immediately before the third notification signal is output, the notification controller 2 is executing control to cause the display device 43 to display notification information based on the first notification information, and the display device 43 is displaying the notification information based on the first notification information. When the third notification signal is output, the notification controller 2 continues the control based on the first notification signal of the display device 43, and after the voice guidance from the speaker 42 based on the first notification signal is completed, the notification controller 2 executes the control based on the third notification signal of the display device 43. That is to say, the display on the display device 43 switches from the display based on the first notification signal to the display based on the third notification signal when the voice guidance from the speaker 42 based on the first notification signal is completed. In addition, the display device 43 ends the display based on the third notification signal of the notification information at the same time as the speaker 42 ends the output based on the third notification signal of the voice guidance.

Other Example Embodiments

The present invention is not limited to the configurations illustrated in the above example embodiments. Other representative example embodiments of the present invention will be described below.

(1) The above-described buzzer 41 may not be provided. In this case, the notification controller 2 may be configured or programmed to, when executing control over the speaker 42 and the display device 43, cause the speaker 42 to output voice guidance and, at the same time, cause the display device 43 to display notification information.

(2) The above-described speaker 42 may not be provided. In this case, the notification controller 2 may be configured or programmed to, when executing control over the buzzer 41 and the display device 43, cause the buzzer 41 to output a sound and, at the same time, cause the display device 43 to display notification information.

(3) The above-described display device 43 may not be provided.

(4) In the example embodiment described above with reference to FIG. 10, when the third notification signal is output after the first notification signal is output and before the execution of the second control based on the first notification signal is completed, the notification controller 2 continues the execution based on the first notification signal of the first control and the second control. In addition, the notification controller 2 is configured or programmed to execute the first control and the second control based on the third notification signal after completing the execution of the first control and the second control based on the first notification signal. However, the notification controller 2 is not limited to this configuration. The notification controller 2 may be configured or programmed to not accept the third notification signal when the third notification signal is output after the first notification signal is output and before the execution based on the first notification signal of the second control is completed. In this case, the notification controller 2 does not execute the first control or the second control based on the third notification signal. That is to say, the notification controller 2 may be configured to be unable to execute the first control or the second control based on the third notification signal when the third notification signal is output after the first notification signal is output and before the execution of the second control based on the first notification signal is completed.

Figure 11:
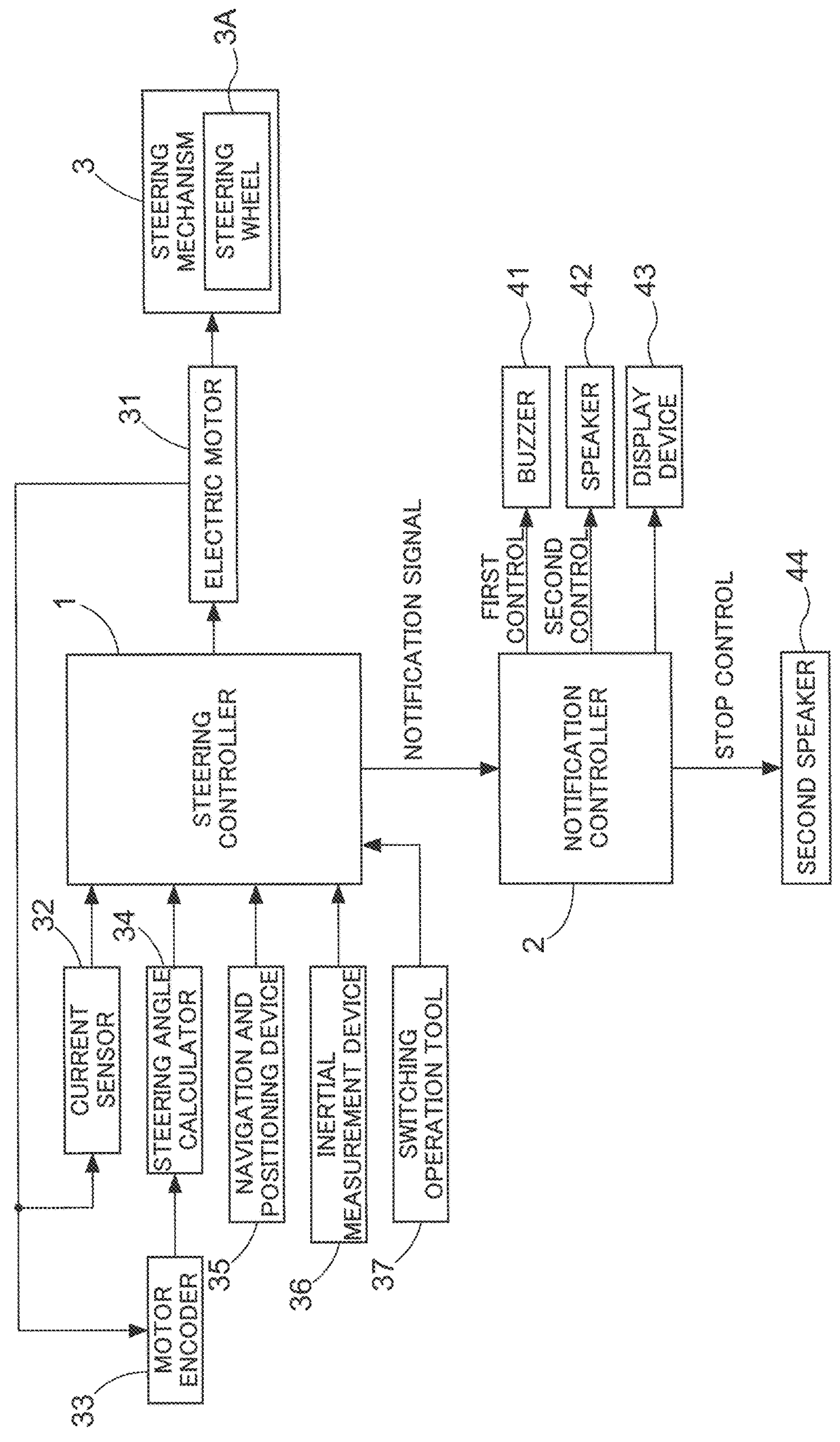
FIG. 11 is a block a diagram showing another example embodiment of the present invention of the notification controller.
Figure 12:
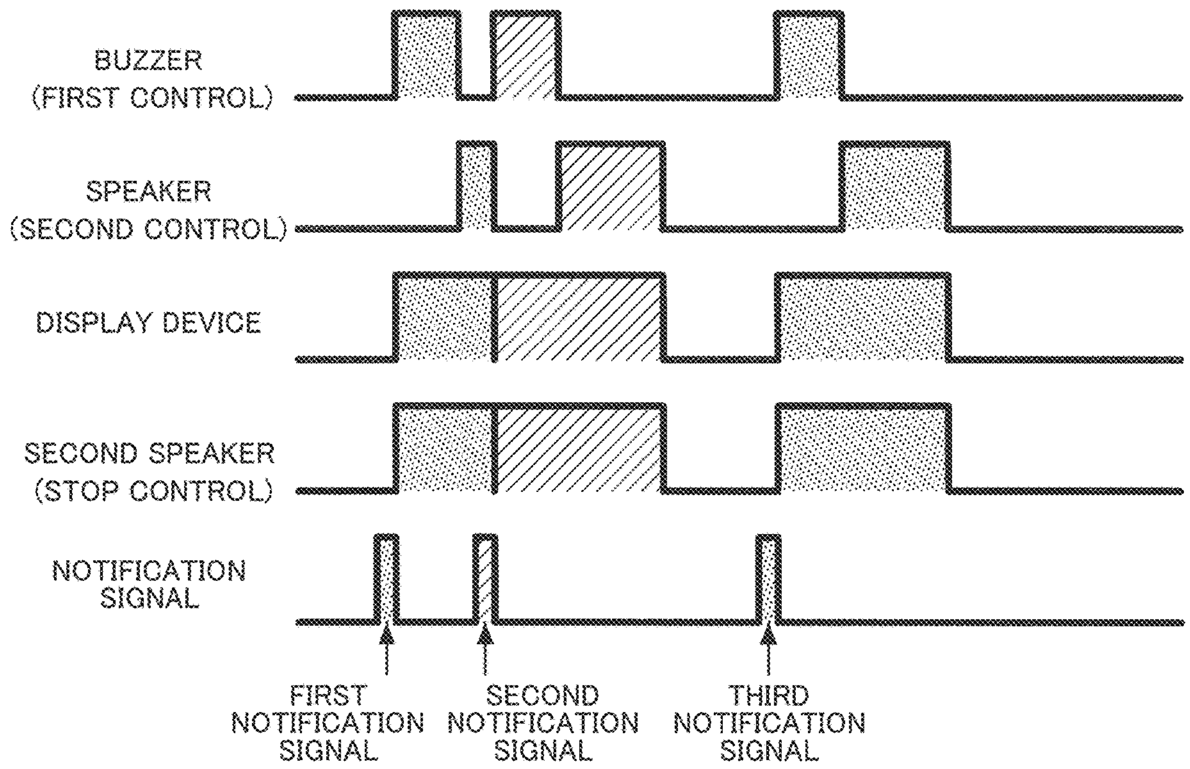
FIG. 12 is a logic graph showing output processing performed by a notification controller according to another example embodiment of the present invention.

(5) As shown in FIG. 11, there may be a case where the agricultural field work vehicle is provided with a second speaker 44 that outputs voice guidance (second voice guidance) relating to information other than information regarding automatic steering. In this case, the notification controller 2 may be configured or programmed to execute stop control to cause the second speaker 44 to immediately stop outputting the voice guidance (the second voice guidance) when at least one of the first and second controls is to be executed. The second speaker 44 may be, for example, a speaker of a radio or music player, or a speaker of a wireless device. As shown in FIG. 12, when the first control and the second control are executed based on the first notification signal, the second notification signal, and the third notification signal, the notification controller 2 simultaneously executes the stop control. While the notification controller 2 is executing the stop control, the output of the second speaker 44 stops.

(6) In the above example embodiments, the notification signals including the first notification signal, the second notification signal, and the third notification signal are output from the steering controller 1 to the notification controller 2, but the present invention is not limited to this example embodiment. For example, the notification controller 2 may be configured or programmed to output the notification signals including the first notification signal, the second notification signal, and the third notification signal while monitoring the state of the steering controller 1.

(7) In the above example embodiment described with reference to FIG. 9, if the second notification signal is output before the notification controller 2 completes the execution of the first control based on the first notification signal, the notification controller 2 immediately stops the execution based on the first notification signal of the first control. The present invention is not limited to this example embodiment, and, for example, the notification controller 2 may be configured or programmed to, even if the second notification signal is output, continue the execution based on the first notification signal of the first control for a predetermined time instead of immediately stopping the execution based on the first notification signal of the first control. The notification controller 2 may be configured or programmed to, after the predetermined time has elapsed, stop executing the first control based on the first notification signal and execute the first control based on the second notification signal. In addition, the notification controller 2 may be configured or programmed to, even if the second notification signal is output, continue the execution based on the first notification signal of the second control for a predetermined time instead of immediately stopping the execution based on the first notification signal of the second control. The notification controller 2 may be configured or programmed to, after the predetermined time has elapsed, stop executing the second control based on the first notification signal and execute the first control based on the second notification signal.

The configurations disclosed in the above example embodiments (including the other example embodiments, the same applies below) can be applied in combination with configurations disclosed in other example embodiments unless a contradiction arises. In addition, the example embodiments disclosed herein are merely examples, and the present invention is not limited to these example embodiments and can be modified as appropriate without departing from the scope of the present invention.

Example embodiments of present the invention are applicable to notification devices for work vehicles and agricultural field work vehicles including the notification devices.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural field work vehicle capable of performing automatic steering along a target route, the agricultural field work vehicle comprising:
- a buzzer to output a sound;
- a first speaker to output voice guidance;
- a steering controller configured or programmed to switch a state between a non-controlling state in which the automatic steering is not executed and an automatic control state in which the automatic steering along the target route is executed; and
- a notification controller configured or programmed to control the buzzer and the first speaker based on a notification signal from the steering controller;
- the notification controller being configured or programmed to, when executing control over the buzzer and the first speaker, execute a first control to cause the buzzer to output the sound, and execute a second control to cause the first speaker to output the voice guidance regarding the automatic steering after the buzzer completes outputting the sound.

2. The agricultural field work vehicle according to claim 1, further comprising:
- a display to display notification information; wherein
- the notification controller is configured or programmed to, when executing the first control, cause the buzzer to output the sound and, at the same time, cause the display to display the notification information.

3. The agricultural field work vehicle according to claim 2, wherein the display is configured to, upon displaying the notification information, continue displaying the notification information until the first speaker completes outputting the voice guidance.

4. The agricultural field work vehicle according to claim 1, wherein the notification controller is configured or programmed to execute the first control and the second control based on a plurality of notification signals each corresponding to a priority;

the plurality of notification signals include a first notification signal and a second notification signal having a higher priority than the first notification signal; and the notification controller is configured or programmed to, when the second notification signal is output after the first notification signal is output and before the execution based on the first notification signal of the second control is completed, stop the execution based on the first notification signal of the first control and the second control and execute the first control and the second control based on the second notification signal.

5. The agricultural field work vehicle according to claim 4, wherein the buzzer is configured to, when the second notification signal is output, output the sound based on the second notification before completing the output based on the first notification signal of the sound.

6. The agricultural field work vehicle according to claim 4, wherein the first speaker is configured to, when the second notification signal is output, immediately stop the output based on the first notification signal of the voice guidance, and output the voice guidance based on the second notification signal after the buzzer completes the output based on the second notification signal of the sound.

7. The agricultural field work vehicle according to claim 1, wherein the notification controller is configured or programmed to execute the first control and the second control based on a plurality of notification signals each corresponding to a priority;

the plurality of notification signals include a first notification signal and a third notification signal having the same priority as the first notification signal or a lower priority than the first notification signal;

the notification controller is configured or programmed to, when the third notification signal is output after the first notification signal is output and before the execution based on the first notification signal of the second control is completed, execute the first control and the second control based on the third notification signal after completing the execution based on the first notification signal of the first control and the second control;

the buzzer is configured to, when the third notification signal is output, output the sound based on the third notification signal after the first speaker completes the output based on the first notification signal of the voice guidance; and the first speaker is configured to, when the third notification signal is output, output the voice guidance based on the third notification signal after the buzzer completes the output based on the third notification signal of the sound.

8. The agricultural field work vehicle according to claim 1, wherein the notification controller is configured or programmed to execute the first control and the second control based on a plurality of notification signals each corresponding to a priority;

the plurality of notification signals include a first notification signal and a third notification signal having the same priority as the first notification signal or a lower priority than the first notification signal; and the notification controller is configured or programmed to be unable to execute the first control or the second control based on the third notification signal when the third notification signal is output after the first notification signal is output and before the execution based on the first notification signal of the second control is completed.

9. The agricultural field work vehicle according to claim 1, further comprising:

a second speaker to output a second voice guidance related to information other than information regarding the automatic steering; wherein the notification controller is configured or programmed to cause the second speaker to immediately stop outputting the second voice guidance when at least one of the first and second controls is to be executed.

10. An agricultural field work vehicle capable of performing automatic steering along a target route, the agricultural field work vehicle comprising:

a buzzer to output a sound;

a display to display notification information;

a steering controller configured or programmed to switch a state between a non-controlling state in which the automatic steering is not executed and an automatic control state in which the automatic steering along the target route is executed; and a notification controller configured or programmed to execute control over the buzzer and the display based on a notification signal from the steering controller;

the notification controller being configured or programmed to, when executing control over the buzzer and the display, cause the buzzer to output the sound and, at the same time, causes the display to display the notification information regarding the automatic steering.

11. An agricultural field work vehicle capable of performing automatic steering along a target route, the agricultural field work vehicle comprising:

a first speaker to output voice guidance;

a display to display notification information;

a steering controller configured or programmed to switch a state between a non-controlling state in which the automatic steering is not executed and an automatic control state in which the automatic steering along the target route is executed; and a notification controller configured or programmed to control the first speaker and the display based on a notification signal from the steering controller;

the notification controller being configured or programmed to, when executing control over the first speaker and the display, cause the first speaker to output the voice guidance and, at the same time, cause the display to display the notification information regarding the automatic steering.

12. The agricultural field work vehicle according to claim 1, wherein the notification controller is configured or programmed to cause the first speaker to output the voice guidance for the start of the automatic steering as the second control in response to the state of the steering controller being switched from the non-controlling state to the automatic control state.

13. The agricultural field work vehicle according to claim 1, wherein the steering controller is configured or programmed to execute a suppression processing which suppresses a steering amount of the automatic steering in a case of the automatic steering starting in response to the state of the steering controller being switched from the non-controlling state to the automatic control state.

* * * * *